INVENTOR:
GUNNAR WILHELMSSON
BY Howson & Howson
ATTYS.

INVENTOR:
GUNNAR WILHELMSSON
BY Howson & Howson
ATTYS.

United States Patent Office 3,426,509
Patented Feb. 11, 1969

1

3,426,509
CYCLONIC SEPARATOR
Gunnar Wilhelmsson, Vaxjo, Sweden, assignor to Aktiebolaget Svenska Flaktfabriken, Stockholm, Sweden
Filed May 31, 1966, Ser. No. 553,749
Claims priority, application Sweden, May 28, 1965, 7,025/65
U.S. Cl. 55—349 1 Claim
Int. Cl. B04c 3/06

ABSTRACT OF THE DISCLOSURE

A cyclonic separator comprising a generally cylindrical casing having an inlet portion with a pair of tangential inlets for introducing dust-laden gas thereinto, and a central outlet tube for exhausting clean gas from the casing. An imperforate end wall at the opposite end has cut-outs in its periphery providing diametrically-opposed dust outlets along the shell of the casing. The separator is mounted horizontally with the outlets in vertical alignment so as to open into a vertical dust channel connected to the casing. A plurality of such separators are connected in vertical alignment and channels are interconnected to form a coherent discharge pipe common to all of the vertically-aligned separators.

The present invention relates to a cyclonic separator, preferably adapted for use in a multi-cyclone unit, comprising a cylindrical casing provided with an inlet portion including two tangential inlets for crude gas, and a coaxially mounted central tube for the discharge of clean gas, and equipped with an outlet for separated dust.

The novel and characteristic feature of the invention is that the casing is terminated at its end opposite to the inlet portion by a plane and wall, and that the dust outlet consists of two openings arranged in said end wall in diametrically opposite relationship close to the peripheral surface of the casing.

Surprisingly, it was found that such a cyclonic separator, in spite of its simple and cheap construction both from a geometrical and manufacturing point of view, shows a high and uniform degree of separation effect without appreciable deteriorations, which easily occur in other precipitators, due to the fact that dust already separated is introduced into the central clean gas flow and taken along by same. Heretofore, this has proved to be a troublesome phenomenon, particularly in small cyclones of multi-cyclone units. For protecting the surface of the cyclone against corrosion and wear, it has proved highly suitable to enamel the internal surfaces of the casing. The hard and smooth enamel surface has also reduced the risk of clogging and, besides, the construction has become lighter in weight, due to the reduced thickness of the material.

Further characterizing features are disclosed in the claim. The embodiment defined in the claim facilitates the assembly of a compact multi-cyclone unit comprising a number of separators arranged both above and to the side of each other while maintaining the aforesaid high degree of separation.

One embodiment of the invention is described in the following in greater detail with reference to the accompanying drawing figures, where—

2

Figure 1:
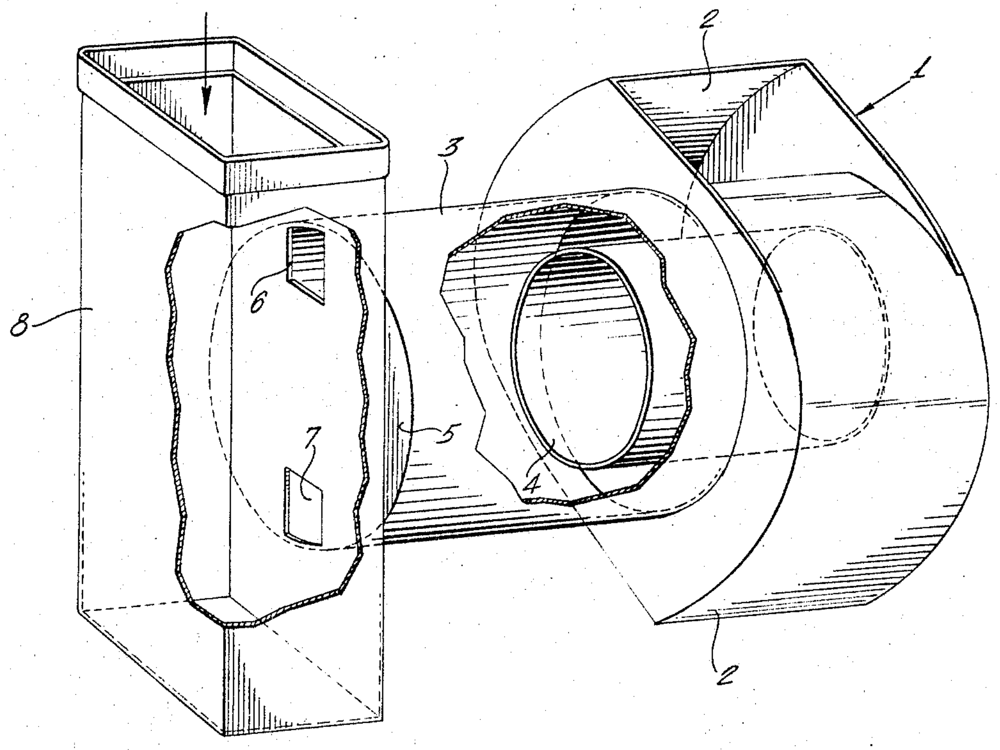
FIG. 1 shows a perspective side view of a cyclonic separator according to the invention.

As appears from FIG. 1, the casing 1 is provided with inlets 2 for crude gas. Due to the fact that because of the design of the inlets the gas is introduced tangentially in a circular path, the dust particles are slung out to the peripheral portion of the casing, whilst the clean gas flows out through a central tube 4, which is arranged coaxially with the cylindrical casing. As a result of said arrangement of the central tube, the dust particles, in addition to their rotary movement, are imparted a translation movement in a direction towards the axis of the cylindrical casing. The casing is terminated by a plane end wall 5, which is provided with two openings 6, and 7 located close to the peripheral surface of the cylindrical casing 3. Due to the movement of the dust particles, the separated dust is discharged through these openings, which open into a vertical dust duct 8, through which the dust is directed to a suitable collecting place.

Figure 2:
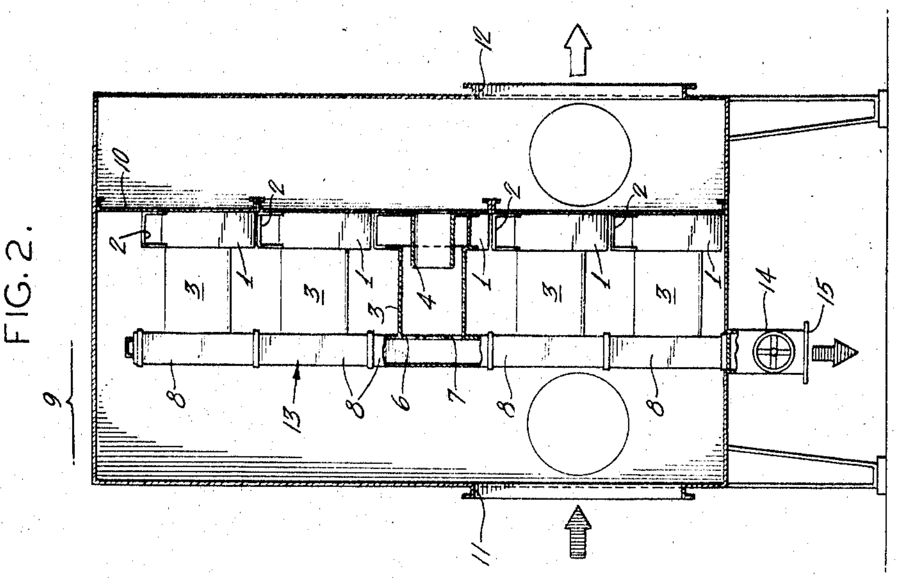
FIG. 2 shows a side-view of a multi-cyclone unit.
Figure 3:
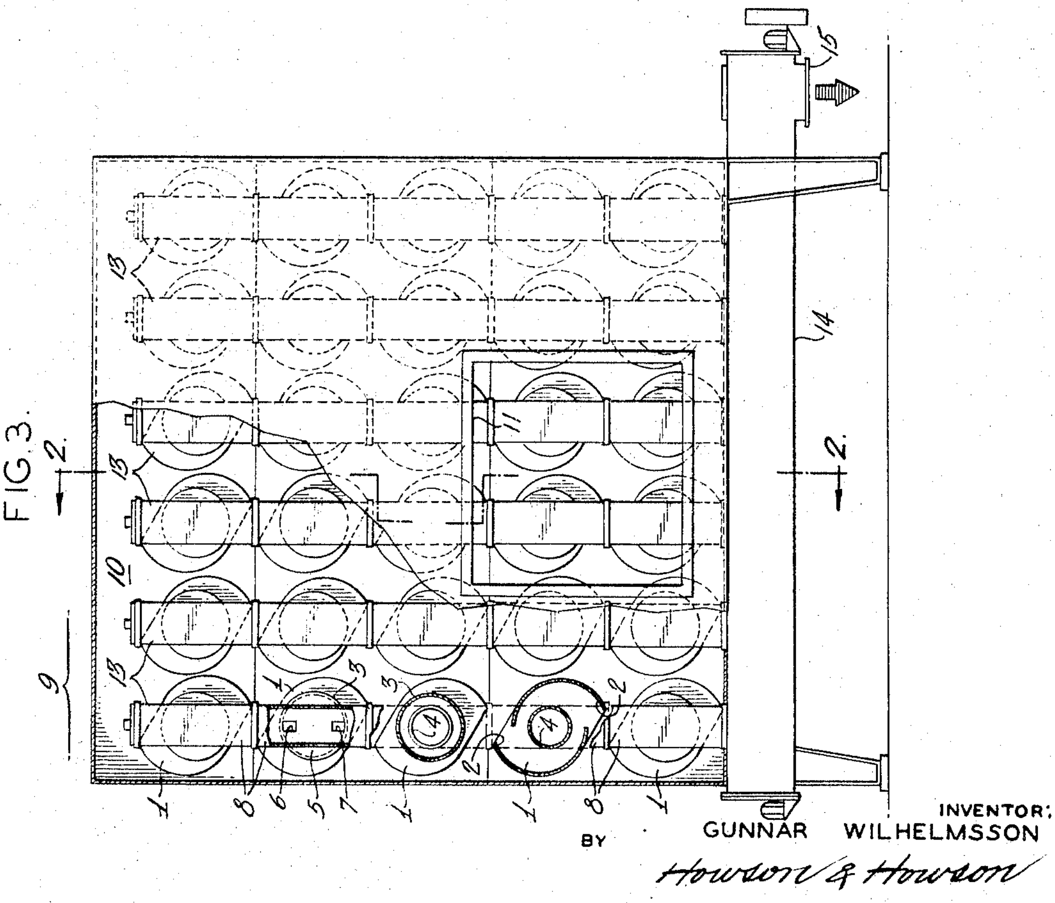
FIG. 3 shows a front view of the same unit.

The cyclonic separator according to the invention can be assembled to a multi-cyclone unit, as shown in FIG. 2 and 3.

Within the container 9 a number of cyclonic separators is assembled to a unit. The container is divided into two sections entirely separated from each other by a partition wall 10. The crude gas flows in through the opening 11 to the tangential inlets 2 of the individual cyclones. The clean gas flows thereafter out through the opening 12, and the separated dust is discharged through the vertical dust duct 13, which is common to the assembled separators, to a collecting pipe 14, from which the dust can be drawn off as desired through the outlet 15.

I claim:

1. A dust-separating aggregate having a plurality of cyclonic separators, each comprising a casing including a shell with a generally cylindrical portion having a central horizontal axis, an inlet end portion beyond one end of said cylindrical portion having at least one tangential inlet for raw gas to the cylindrical portion, a tube coaxial with said axis projecting centrally through said inlet portion beyond said tangential inlet into said cylindrical portion to constitute a clean gas outlet, said cylindrical portion terminating at the opposite end in an edge in a vertical plane perpendicular to said central axis, and spaced from said outlet tube, and a vertical dust duct section connected to said cylindrical portion at said edge, having a common vertical plane end wall coplanar with said edge extending to said edge about its periphery and having two vertically-aligned cut-outs disposed diametrically opposite in its periphery to cooperate with said edge providing two dust openings for discharging the separated dust into said duct seciton, said separators being disposed in vertical alignment, the vertical dust duct sections of said separators being interconnected to form a coherent discharge duct common to all of said vertically aligned separators of said aggregate, said end wall being imperforate except for said cut-outs and said duct being closed at one end whereby the dust is separated from the gas flow prior to the passage of the dust through said openings into said duct.

(References on following page)

References Cited

UNITED STATES PATENTS

| | | | |
|---|---|---|---|
| 2,229,824 | 1/1941 | Shaw | 55—435 |
| 2,869,677 | 1/1959 | Yellott et al. | 55—459 |
| 2,494,465 | 1/1950 | Watson et al. | 55—459 |
| 2,771,962 | 11/1956 | Yellott et al. | 55—435 |
| 2,818,935 | 1/1958 | Kemmetmuller | 55—347 |
| 2,848,061 | 8/1958 | Allander et al. | 55—349 |
| 2,854,092 | 9/1958 | Gustavsson | 55—349 |
| 2,963,109 | 12/1960 | Brookman et al. | 55—349 |
| 3,264,806 | 8/1966 | Neumann | 55—346 |

HARRY B. THORNTON, *Primary Examiner.*

BERNARD NOZICK, *Assistant Examiner.*

U.S. Cl. X.R.

55—435, 459; 209—144